Dec. 13, 1927.
H. P. CHANDLER
TROLLEY GUARD
Filed Oct. 14, 1925
1,652,425
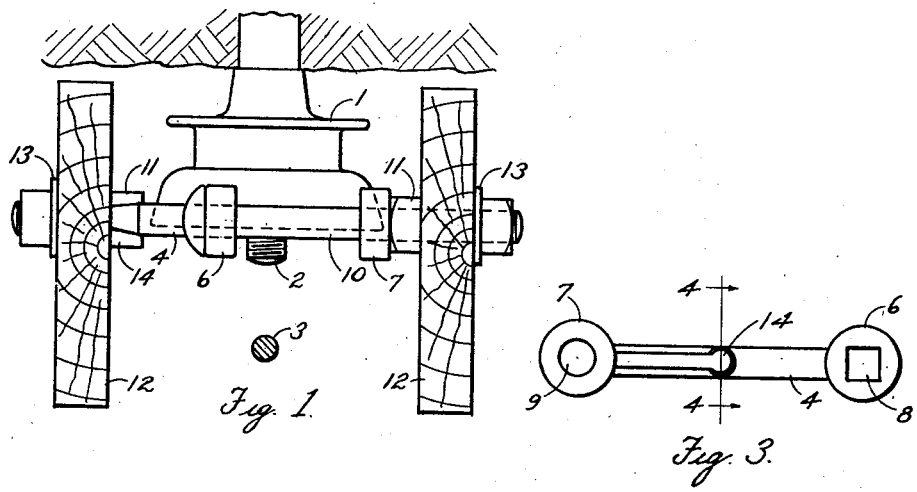
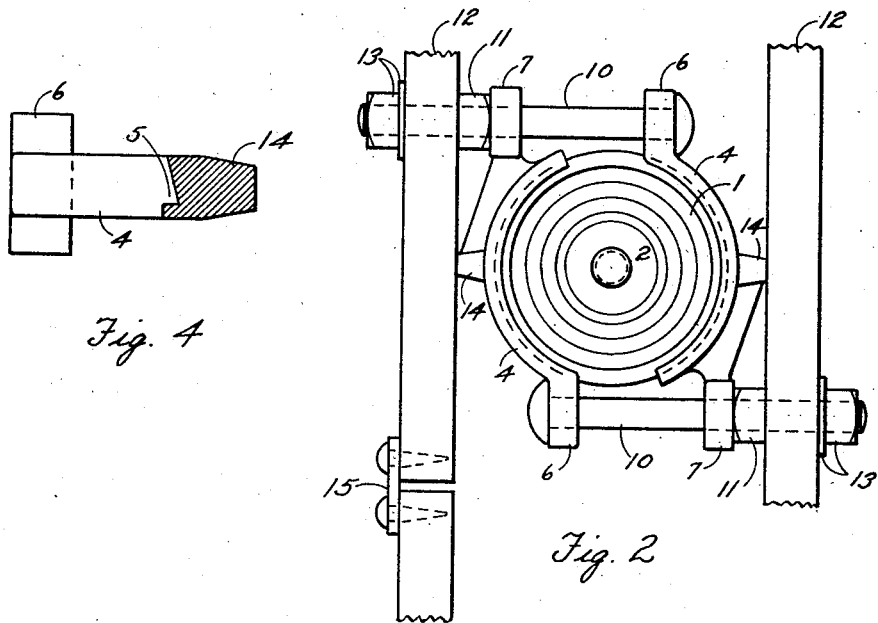
Inventor
Homer P. Chandler Patented Dec. 13, 1927.

1,652,425

UNITED STATES PATENT OFFICE.

HOMER P. CHANDLER, OF MANSFIELD, OHIO, ASSIGNOR TO THE OHIO BRASS COMPANY, OF MANSFIELD, OHIO, A CORPORATION OF NEW JERSEY.

TROLLEY GUARD.

Application filed October 14, 1925. Serial No. 62,381.

My invention relates to guards for use in mines to give protection against contact with the trolley wire or other charged conductor. While my invention is primarily designed for use in mines it is applicable to other conditions where it is desired to protect charged conductors from being contacted with.

The object of my invention is to provide a device of the above character which is simple, inexpensive and easy to be applied to hangers used in supporting the trolley wire from the roof of the mine or to other supports, and my invention resides in the new and novel construction, combination and relation of the various parts hereinafter fully described and disclosed in the drawing accompanying this specification.

In the drawing:

Fig. 1 is an end view of my invention shown as installed upon a hanger which in turn is secured to the roof of a mine.

Fig. 2 is a bottom plan view of the hanger, guards and guard supports shown in Fig. 1.

Fig. 3 is a side view of one of the guard supports used in securing the side boards to the hanger.

Fig. 4 is a sectional view of Fig. 3 on the line 4—4.

In the preferred form of my invention I employ a hanger 1 which has means for securing it to a support and a threaded stud 2 to which a trolley clamp may be secured for supporting the trolley wire 3 thereto in insulated relation to the mine roof or ground. The hanger 1 is not of any particular design as there are many hangers on the market at the present day used for the purpose of supporting a trolley wire in insulated relation to the ground and which can be used for the purpose I describe.

To the lower edge of the hanger 1 are secured two bracket members 4, preferably of metal, and which are duplicates and are provided with a groove 5 to fit the lower edge of the hanger 1 and enclose a considerable portion of the lower circumference of the hanger. Each bracket is provided with oppositely disposed lugs 6 and 7 and the lug 6 is shown with a square hole 8 and the lug 7 with a round hole 9. When the two bracket castings are positioned on the hanger 1 the hole or passage 8 of one bracket registers with the hole or passage 9 of the other bracket, and positioned in each pair of registered holes is a bolt 10 and upon each bolt is secured a nut 11 which when drawn into position will hold and maintain the brackets in position upon the hanger.

The usual practice in supporting a trolley wire is to place the hanger 1 at quite frequent intervals, namely; from five to fifteen feet, depending upon the conditions. This permits the use of side boards or guard boards 12 which I mount upon the bolts 10 and secure thereto by means of the nut and washer 13 and by means of which the guard or side boards are drawn into engagement with the nuts 11. Where the ends of the boards abut such adjacent ends may be secured together in any well known way as will be obvious to one skilled in the art, as by means of an overlapping strip of metal 15 secured to both boards adjacent their ends as shown in Fig. 2. In order to further brace the guard boards 12 I provide each bracket with a projecting boss 14 which is engaged by the guard board 12 when the same is properly positioned.

I find that the construction of guard board and bracket which I employ permits the application of a guard to the hangers already installed without disturbing the same and also permits replacing the hanger if desired without doing more than loosening the bolts, nuts and brackets on such hanger as it is desired to replace and the new hanger can be positioned and the brackets, bolts and nuts returned to their normal position upon the new hanger.

It will be noted that the lower edge of the guards 12 extend below the line of the conductor 3 and, therefore, any object passing transversely to the trolley wire is either prevented from engaging with the trolley wire 3 or the chances of engagement are very much reduced. By making the hole 8 square and using what is known as a carriage bolt in securing the parts in position the bolt is prevented from rotating for the reason that the carriage bolt is provided with a square bolt adjacent the head which corresponds with the square hole 8.

Modifications will suggest themselves to those skilled in the art, but I do not wish to be limited other than by my claims.

I claim:

1. A guard for a conductor comprising a hanger, a pair of brackets rotatably adjustable relative to each other and to the hanger and secured to the lower edge of the hanger, the brackets having circularly formed and grooved faces to engage the hanger, means to secure the brackets in adjusted position on the hanger and spaced guard boards secured to the brackets.

2. A guard for a conductor comprising a hanger, a pair of brackets adjustable relative to each other and to the hanger and secured to the lower edge of the hanger, means to secure the brackets in adjusted position on the hanger, spaced guard boards secured to the brackets by the said securing means and means on the brackets to engage the adjacent guard board to brace the same.

3. A guard for a conductor comprising a hanger to support the conductor, parallel and spaced guard boards parallel to the conductor and positioned in a vertical plane, means secured to the hanger and the guard boards to support the boards from the hanger, the said means comprising a pair of spaced members secured to the hanger, a pair of lugs projecting from each member at separated points and each lug having a passage, one of the lugs on each member having their passages aligned, a bolt passing through each of the two pair of aligned passages and each bolt passing through one of the boards transversely thereto, means on each bolt to engage one lug on one member and other means on each bolt to engage the lug alined therewith to draw the lugs toward each other and clamp the members to the hanger, means on each bolt to engage the board thereon and hold it in position and means on each member to engage one of the boards to brace the same.

4. A guard for a conductor comprising a hanger to support a trolley wire, a pair of spaced brackets adapted to be secured to a support and rotatably adjustable relative to each other and to the hanger in a plane parallel to the plane of the trolley wire, means to secure the brackets in adjusted position on the support, guard boards mounted upon the said means and means to secure the boards in position on the said securing means and permit removal of the boards without disturbing the relation between the brackets and support.

5. A guard for a conductor comprising a pair of spaced brackets adapted to be secured to a support, a pair of spaced guard boards, means to secure the brackets to the support and means to secure the boards to the said securing means without disturbing the relation of the brackets to the support and in immovable relation to the support.

In testimony whereof I affix my signature.

HOMER P. CHANDLER.